United States Patent [19]
Kazakevich

[11] 3,992,797
[45] Nov. 23, 1976

[54] FISHING WARNING LIGHT DEVICE

[76] Inventor: Alger A. Kazakevich, 934 E. Gardenia, Madison Heights, Mich. 48071

[22] Filed: Sept. 3, 1975

[21] Appl. No.: 609,972

[52] U.S. Cl. ............................................. 43/17
[51] Int. Cl.² ................................... A01K 97/12
[58] Field of Search ..................... 43/17, 25, 25.2

[56] References Cited
UNITED STATES PATENTS

| | | | |
|---|---|---|---|
| 2,530,050 | 11/1950 | Evans | 43/17 |
| 2,634,538 | 4/1953 | Sader et al. | 43/17 |
| 2,680,842 | 6/1954 | Opphile | 43/17 |
| 3,188,767 | 6/1965 | Finefield | 43/17 |

*Primary Examiner*—Warner H. Camp
*Attorney, Agent, or Firm*—William L. Fisher

[57] ABSTRACT

Improvement in a fishing warning light device having a battery operated light to warn a fisherman that a fish is biting on a fishing pole and electrical circuitry for lighting the light, the improvement comprising a lengthwise extending insulative base, the base carrying the circuitry, and a mechanism for removably mounting the device in an in-use position thereof on the pole so that the base is disposed lengthwise of the pole in the in-use position, the mounting mechanism for the device arranged to squeeze the base against an eye on the pole so as to make a solid mechanical connection between the device and the pole, the mounting mechanism comprising a slot in one end of the base for engaging the eye, and a pinch type fastener on the other end of the base for clamping on the pole, the fastener moveable lengthwise of the pole to push the base against the eye, whereby the squeezing of the base is accomplished by the fastener forcing the slot into full length engagement with the eye.

4 Claims, 6 Drawing Figures

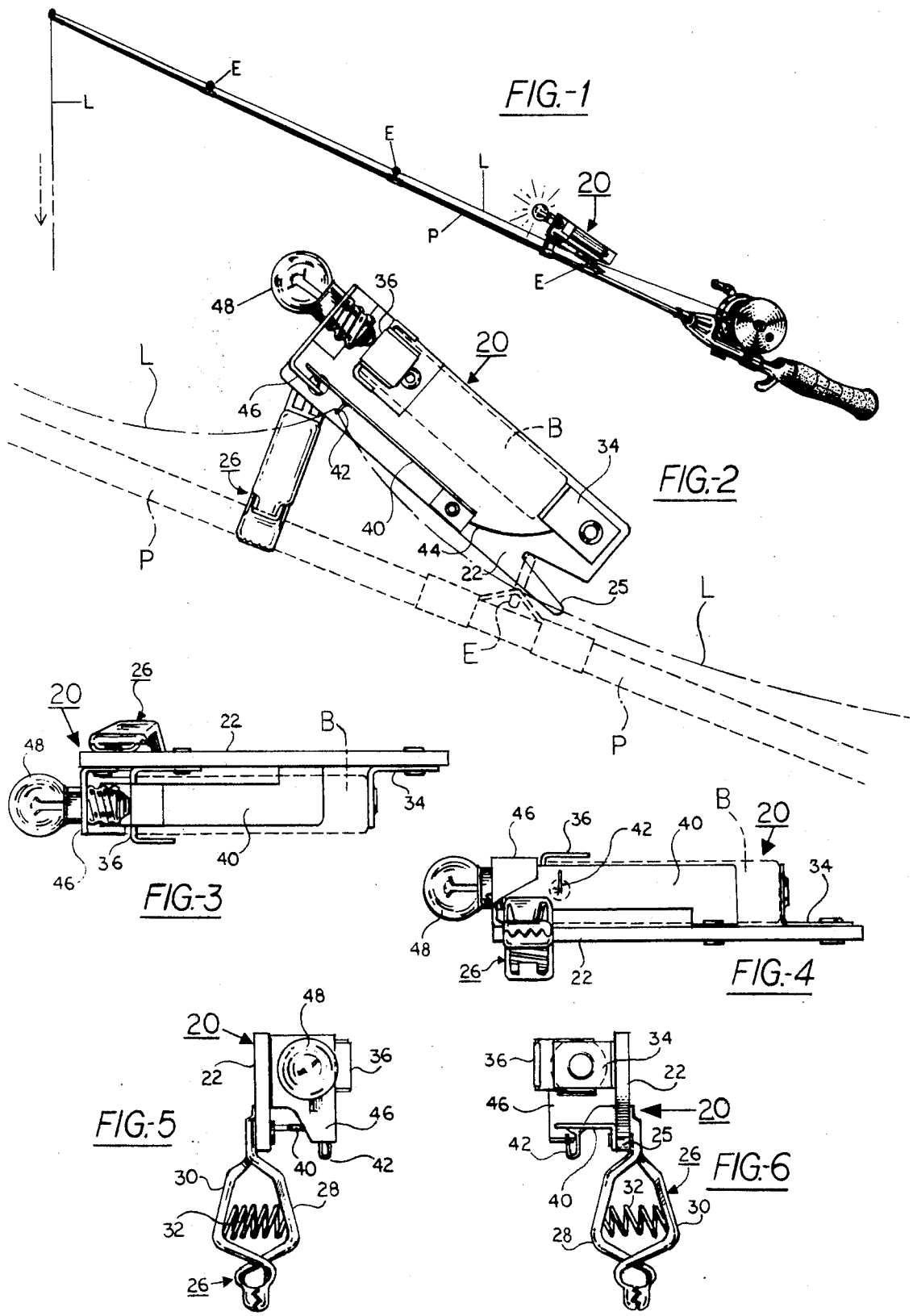

FISHING WARNING LIGHT DEVICE

My invention relates to fishing.

The principal object of my invention is to provide improvements in a fishing warning light device including simplifying the construction and manufacture thereof to make the same compact, easily portable and extremely useful.

The foregoing object of my invention and the advantages thereof will become apparent during the course of the following description, taken in conjunction with the accompanying drawings, in which:

FIGS. 1 and 2 are, respectively, perspective and side elevational views of a fishing warning light device embodying my invention and shown mounted on a fishing pole;

FIGS. 3–6 are, respectively, top and bottom plan and opposite end elevational views of said embodiment.

Referring to the drawings in greater detail, 20 generally designates said embodiment which comprises a lengthwise extending insulative base 22 and fastening means for fastening said base 22 to a conventional fishing pole P equipped with eyes E for guiding a fishing line L along the length of said pole P. Said fastening means comprises an open-ended slot 25 and a manually actuable spring clip 26 having opposed arms 28 and 30 and a compression spring 32 therebetween. Said arms 28 and 30 are doubly bent and made to intersect so as to form toothed fingers which face each other for gripping purposes. Said clip 26 and slot 25 are at opposite ends of said base 22 for mounting said device 20 lengthwise on said pole P in an in-use position thereof. The arrangement described for mounting said device 20 on said pole P makes for a surprisingly solid connection between said device 20 and said pole P since said slot 25 can be inserted full length into one of said eyes E and the device 20 pushed against said eye E by virtue of said clip 26 being moveable lengthwise of said pole P. Said device can be mounted on said pole P adjacent any one of said eyes E and can be disposed above or below said pole P with said bulb 48 facing toward or away from the handle of the pole P.

Said base 22 also has electrical means mounted thereon comprising electrical switch means and spaced apart battery holders 34 and 36 for holding a battery B on said base 22. Said switch means comprises a moveable spring arm 40 serving as a switch contact and having a hook 42 thereon for engaging said line L and a second switch contact 46 which is stationary and serves as a mounting means for threadably engaging the threaded base of a light bulb 48. Said holder 36 also serves as a contact member for contacting said battery B and the contact member on the bottom of the base of said bulb 48. Said holder 34 has a central aperture in the contact portion thereof for engaging the contact member on an end of the battery B and is electrically connected to the switch arm 40 by a wire 44.

In operation of said device 20, the same is mounted on said fishing pole P as shown and described so that said slot 25 engages an eye E on said pole P and so that said arms 28 and 30 clamp on said pole P as closely as possible to said eye E so that said base 22 is pushed against said eye E with said slot 25 fully engaged therein. Said device 20 is thus firmly held in place on said pole P. Said fishing line L is arranged to be captured by said hook 42 as shown. When a fish bites on said line L said hook 42 is pulled to move said switch arm 40 toward said pole P into engagement with said switch contact 46 to close said switch means, whereby to complete an electrical circuit to light the bulb 48 and warn a fisherman that a fish is biting on the line. Said device 20 is so compact that a plurality of them can be easily carried in a fisherman's pocket for simultaneous use with a corresponding number of fishing poles. Said device 20 is particularly valuable to a fisherman who fishes with a plurality of poles at one time and does'nt know exactly which pole has a fish biting thereon. Because said device is so compact and easy to attach to and remove from a fishing pole it can be readily removed as soon as a fish bites and remounted after the fishing pole is set for another catch.

It will thus be seen that there has been provided by my invention improvements in a fishing warning light device in which the object hereinabove set forth, together with many thoroughly practical advantages, has been successfully achieved. While a preferred embodiment of my invention has been shown and described, it is to be understood that variations and changes may be resorted to without departing from the spirit of my invention, as defined by the appended claims.

What I claim is:

1. Improvement in a fishing warning light device having a battery operated light to warn a fisherman that a fish is biting on a fishing pole and electrical circuitry for lighting said light, said improvement comprising a lengthwise extending insulative base, said base carrying said circuitry, and means for removably mounting said device in an in-use position thereof on said pole so that said base is disposed lengthwise of said pole in said in-use position, said mounting means for said device arranged to squeeze said base against a stationary member on said pole so as to make a solid mechanical connection between said device and said pole, said mounting means comprising engaging means on said base for engaging said stationary member and a pinch type fastener for clamping on said pole, said fastener moveable lengthwise of said pole to push said base against said stationary member, whereby said squeezing of said base is accomplished by said fastener forcing said engaging means into engagement with said stationary member.

2. Improvement in a fishing warning light device having a battery operated light to warn a fisherman that a fish is biting on a fishing pole and electrical circuitry for lighting said light, said improvement comprising a lengthwise extending insulative base, said base carrying said circuitry, and means for removably mounting said device in an in-use position thereof on said pole so that said base is disposed lengthwise of said pole in said in-use position, said mounting means for said device arranged to squeeze said base against an eye on said pole so as to make a solid mechanical connection between said device and said pole, said mounting means comprising a slot in one end of said base for engaging said eye, and a pinch type fastener on the other end of said base for clamping on said pole, said fastener moveable lengthwise of said pole to push said base against said eye, whereby said squeezing of said base is accomplished by said fastener forcing said slot into full length engagement with said eye.

3. Improvement as claimed in claim 2, said circuitry including a conductive member which serves as a switch contact and as a mounting means for said light.

4. Improvement as claimed in claim 3, said circuitry including a second conductive member which serves as a mounting means for said battery and as a contact member for both said battery and said light.

* * * * *